(12) United States Patent
Hong

(10) Patent No.: US 11,151,363 B2
(45) Date of Patent: Oct. 19, 2021

(54) EXPRESSION RECOGNITION METHOD, APPARATUS, ELECTRONIC DEVICE, AND STORAGE MEDIUM

(71) Applicant: BAIDU ONLINE NETWORK TECHNOLOGY (BEIJING) CO., LTD., Beijing (CN)

(72) Inventor: Zhibin Hong, Beijing (CN)

(73) Assignee: BAIDU ONLINE NETWORK TECHNOLOGY (BEIJING) CO., LTD.

( * ) Notice: Subject to any disclaimer, the term of this patent is extended or adjusted under 35 U.S.C. 154(b) by 0 days.

(21) Appl. No.: 16/562,773

(22) Filed: Sep. 6, 2019

(65) Prior Publication Data

US 2019/0392202 A1 Dec. 26, 2019

(30) Foreign Application Priority Data

Oct. 30, 2018 (CN) .......................... 201811280336.2

(51) Int. Cl.
*G06K 9/00* (2006.01)
*G06K 9/62* (2006.01)
*G06N 3/08* (2006.01)

(52) U.S. Cl.
CPC ..... *G06K 9/00308* (2013.01); *G06K 9/00228* (2013.01); *G06K 9/00268* (2013.01); *G06K 9/6256* (2013.01); *G06N 3/08* (2013.01)

(58) Field of Classification Search
CPC ............. G06K 9/00308; G06K 9/6256; G06K 9/00268; G06K 9/4671; G06K 9/629;
(Continued)

(56) References Cited

U.S. PATENT DOCUMENTS

2015/0242707 A1\* 8/2015 Wilf ..................... G06K 9/6256
382/159
2016/0275341 A1 9/2016 Li et al.
(Continued)

FOREIGN PATENT DOCUMENTS

CN 104732216 A 6/2015
CN 105512624 A 4/2016
(Continued)

OTHER PUBLICATIONS

Jiang, "Facial Characteristic Extraction and Authentification Method and Device", 2015, pp. 1-22 (Year: 2015).\*
(Continued)

*Primary Examiner* — Siamak Harandi
(74) *Attorney, Agent, or Firm* — Dilworth IP, LLC

(57) ABSTRACT

Embodiments of the present disclosure provide an expression recognition method, apparatus, electronic device and storage medium. An expression recognition model includes a convolutional neural network model, a fully connected network model and a bilinear network model. During an expression recognition process, after an image to be recognized is pre-processed to obtain a facial image and a key point coordinate vector, the facial image is computed by the convolutional neural network model to output a first feature vector, the key point coordinate vector is computed by the fully connected network model to output a second feature vector, the first feature vector and the second feature vector are computed by the bilinear network model to obtain second-order information, and an expression recognition result in turn is obtained according to the second-order information. During this process, robustness of gestures and illuminations is better, and accuracy of expression recognition is improved.

20 Claims, 5 Drawing Sheets

(58) Field of Classification Search
CPC ............. G06K 9/4619; G06K 9/00288; G06K 9/00302; G06K 9/00228; G06K 9/6292; G06N 3/08; G06N 3/0454
See application file for complete search history.

(56) References Cited

U.S. PATENT DOCUMENTS

| | | | |
|---|---|---|---|
| 2017/0169304 | A1 | 6/2017 | Jia et al. |
| 2017/0286809 | A1* | 10/2017 | Pankanti ................ G06N 3/084 |
| 2017/0304732 | A1* | 10/2017 | Velic ..................... A63H 33/08 |

FOREIGN PATENT DOCUMENTS

| | | |
|---|---|---|
| CN | 107657204 A | 2/2018 |
| CN | 107704847 A | 2/2018 |
| CN | 107808146 A | 3/2018 |
| CN | 108197602 A | 6/2018 |
| CN | 108229268 A | 6/2018 |
| WO | 2018089289 A1 | 5/2018 |

OTHER PUBLICATIONS

First Office Action issued in CN Patent Application No. 201811280336.2 dated May 8, 2020.
Chowdhury Aruni Roy et al., "One-to-many face recognition with bilinear CNNs", 2016 IEEE Winter Conference on Applications of Computer Vision IEEE, Mar. 7, 2016, pp. 1-9.
European Search Report, Application No. EP 19 19 6510, dated Oct. 8, 2019, 9 pages.
Xu Huan, Facial Expression Recognition Techniques Based on Bilinear Model, Beijing University of Technology, Jul. 2014, pp. 90-93.
Li Si-quin et al., Study on Face Expression Recognition Based Convolutional Neural Network, School of Optical-Electrical and Computer Engineering, University of Shanghai for Science and Technology, Jan. 2018, vol. 17, No. 1, pp. 28-31.
Li, Yanghao et al., Factorized Bilinear Models for Image Recognition, Institute of Computer Science and Technology, Peking University, 2017, IEEE International, pp. 1-10.
Notice of Allowance in CN Patent Application No. 201811280336.2 dated Apr. 16, 2021.

* cited by examiner

US 11,151,363 B2

EXPRESSION RECOGNITION METHOD, APPARATUS, ELECTRONIC DEVICE, AND STORAGE MEDIUM

CROSS-REFERENCE TO RELATED APPLICATION

This application claims priority to Chinese Patent Application No. 201811280336.2, filed on Oct. 30, 2018, which is hereby incorporated by reference in its entirety.

TECHNICAL FIELD

Embodiments of the present disclosure relate to the field of image processing technologies and, in particular, to an expression recognition method, apparatus, electronic device and storage medium.

BACKGROUND

At present, the expression recognition technology is widely used in the fields of human-computer interaction, driving assist, distance education, and targeted advertising. The expression recognition technology refers to a technique for obtaining and recognizing a facial expression from an image or a video sequence containing a human face. Basic facial expression categories include eight types, that is, angry, contempt, disgust, fear, happiness, sadness, surprise, and neutral.

During an existing expression recognition process, methods such as a scale-invariant feature transform (SIFT), a histogram of oriented gradient (HOG) and the like are usually used to extract expression features, then a support vector machine (SVM) classifier, a single model convolutional neural network and the like are used to obtain classification results, and then a facial expression image with facial alignment is computed by the single model neural network as input to obtain an expression classification result.

During the above expression recognition process, an expression is recognized by the single model convolutional neural network based on an extracted feature. During the recognition, only first-order information of the facial expression image is used, but high-order feature information is not used, due to poor robustness of gestures and illuminations, there is low accuracy of expression recognition in a real scenario, and recognition effects are not satisfactory. Especially in a case of low expression intensity, it is extremely easy to cause false recognition.

SUMMARY

The present disclosure provides an expression recognition method, apparatus, electronic device and storage medium, which uses a training model composed of a neural network model, a fully connected network model and a bilinear network model to recognize a character expression included in an image to be recognized. During a recognition process, after a feature is extracted from the image to be recognized, the feature is further processed to obtain second-order information, and an expression is recognized according to the second-order information, thereby improving accuracy of the expression recognition.

In a first aspect, the present disclosure provides an expression recognition method, including:

pre-processing an image to be recognized to obtain a facial image and a key point coordinate vector, where the facial image is contained in the image to be recognized;

computing the facial image using a convolutional neural network model to output a first feature vector, and computing the key point coordinate vector using a fully connected network model to output a second feature vector, where the first feature vector and the second feature vector are used to determine an expression of a face in the facial image; and computing the first feature vector and the second feature vector using a bilinear network model to extract a second-order feature, and classifying the second-order feature to obtain the expression of the face.

In a possible implementation, before the pre-processing an image to be recognized to obtain a facial image and a key point coordinate vector, further including:

training the convolutional neural network model, the fully connected network model and the bilinear network model.

In a possible implementation, the raining the convolutional neural network model, the fully connected network model and the bilinear network model is performed by:

pre-processing, for each sample image in a training set, the sample image to obtain the sample facial image and a sample key point coordinate vector;

training, according to the sample facial image, the convolutional neural network model;

training, according to the sample key point coordinate vector, the fully connected network model; and training, according to an output result of the convolutional neural network model and an output result of the fully connected network model, the bilinear network model.

In a possible implementation, the pre-processing each sample image in a training set to obtain the sample facial image and a sample key point coordinate vector includes:

determining a first local image from the sample image, where the first local image includes the sample facial image;

determining, in the first local image, a preset number of sample key points;

determining, according to coordinates of all of the sample key points, a similarity transformation matrix;

cropping, according to the similarity transformation matrix, a second local image from the sample image and performing a facial alignment on the second local image to obtain a third local image; and determining, in the third local image, mapping points for all of the sample key points;

performing a random data enhancement on the third local image to obtain the sample facial image, and mapping the mapping points for all of the sample key points in the third local image to the sample facial image; and obtaining, according to the coordinates of all of the sample key points in the sample facial image, the sample key point coordinate vector.

In a possible implementation, the determining, according to coordinates of all of the sample key points, a similarity transformation matrix includes:

determining an average value for the coordinates of all of the sample key points;

determining, from the coordinates of all of the sample key points, a maximum coordinate and a minimum coordinate, and determining a difference between the maximum coordinate and the minimum coordinate; and determining, according to the difference and the average value, the similarity transformation matrix.

In a possible implementation, before the performing a random data enhancement on the third local image to obtain the sample facial image, further including:

normalizing the third local image so that a pixel value for each pixel in the third local image is subject to a standard normal distribution.

In a possible implementation, the random data enhancement includes: a random flip, a random translation, a random scaling, a random gradation, a random Gamma transformation or a random additive white Gaussian noise.

In a possible implementation, the training the convolutional neural network model includes:

training the convolutional neural network model using a loss function.

In a possible implementation, the loss function is a cross entropy loss function, and the cross entropy loss function has a regularization mode of L2 regularity.

In a second aspect, an embodiment of the present disclosure provides an expression recognition apparatus, including:

a pre-processing module, configured to pre-process an image to be recognized to obtain a facial image and a key point coordinate vector, where the facial image is contained in the image to be recognized;

a first computing module, configured to compute the facial image using a convolutional neural network model to output a first feature vector;

a second computing module, configured to compute the key point coordinate vector using a fully connected network model to output a second feature vector, where the first feature vector and the second feature vector are used to determine an expression of a face in the facial image; and a third computing module, configured to compute the first feature vector and the second feature vector using a bilinear network model to extract a second-order feature, and classify the second-order feature to obtain the expression of the face.

In a possible implementation, the above apparatus further includes:

a training module, configured to train the convolutional neural network model, the fully connected network model and the bilinear network model before the pre-processing module pre-processes an image to be recognized to obtain a facial image and a key point coordinate vector.

In a possible implementation, the training module is specifically configured to: for each sample image in a training set, pre-process the sample image to obtain the sample facial image and a sample key point coordinate vector; train the convolutional neural network model according to the sample facial image; train the fully connected network model according to the sample key point coordinate vector; and train the bilinear network model according to an output result of the convolutional neural network model and an output result of the fully connected network model.

In a possible implementation, when each sample image in a training set is pre-processed to obtain the sample facial image and a sample key point coordinate vector, the training module is specifically configured to: determine a first local image from the sample image, where the first local image includes the sample facial image; determine a preset number of sample key points in the first local image; determine a similarity transformation matrix according to coordinates of all of the sample key points; crop a second local image from the sample image according to the similarity transformation matrix and perform a facial alignment on the second local image to obtain a third local image; and determine mapping points for all of the sample key points in the third local image; perform a random data enhancement on the third local image to obtain the sample facial image, and map the mapping points for all of the sample key points in the third local image to the sample facial image; and obtain the sample key point coordinate vector according to the coordinates of all of the sample key points in the sample facial image.

In a possible implementation, when a similarity transformation matrix is determined according to coordinates of all of the sample key points, the training module is specifically configured to: determine an average value for the coordinates of all of the sample key points; determine a maximum coordinate and a minimum coordinate from the coordinates of all of the sample key points, and determine a difference between the maximum coordinate and the minimum coordinate; and determine the similarity transformation matrix according to the difference and the average value.

In a possible implementation, before a random data enhancement is performed on the third local image to obtain the sample facial image, the training module is further configured to normalize the third local image so that a pixel value for each pixel in the third local image is subject to a standard normal distribution.

In a possible implementation, the random data enhancement includes: a random flip, a random translation, a random scaling, a random gradation, a random Gamma transformation or a random additive white Gaussian noise.

In a possible implementation, when training the convolutional neural network model, the training module trains the convolutional neural network model using a loss function.

In a possible implementation, the loss function is a cross entropy loss function, and the cross entropy loss function has a regularization mode of L2 regularity.

In a third aspect, an embodiment of the present disclosure provides an electronic device including a processor, a memory and a computer program stored on the memory and executable on the processor, where the processor executes the program to implement the method according to the first aspect or various possible implementations of the first aspect.

In a fourth aspect, an embodiment of the present disclosure provides an storage medium, where the storage medium is stored with an instructions which, when executable on a computer, causes the computer to perform the method according to the first aspect or various possible implementations of the first aspect.

In a fifth aspect, an embodiment of the present disclosure provides a computer program product which, when running on a computer, causes the computer to perform the method according to the first aspect or various possible implementations of the first aspect.

According to the expression recognition method, apparatus, electronic device and storage medium provided in the embodiments of the present disclosure, an expression recognition model includes a convolutional neural network model, a fully connected network model and a bilinear network model, and the output of the neural network model and the output of the fully connected network model are connected to the input of the bilinear network model. During an expression recognition process, after an image to be recognized is pre-processed to obtain a facial image and a key point coordinate vector, the facial image is computed by the convolutional neural network model to output a first feature vector, the key point coordinate vector is computed by the fully connected network model to output a second feature vector, the first feature vector and the second feature vector are computed by the bilinear network model to obtain second-order information, and an expression recognition result in turn is obtained according to the second-order information. During this process, in consideration of priori expression information contained in key points of a human face, robustness of gestures and illuminations is better, and accuracy of expression recognition is improved. Further, when there is low expression intensity, an expression can also be correctly recognized.

BRIEF DESCRIPTION OF THE DRAWINGS

In order to more clearly illustrate the technical solutions in the embodiments of the present disclosure or in the prior art, the drawings used in description of the embodiments or the prior art will be briefly described below. Obviously, the drawings in the following description are some embodiments of the present disclosure, and those of ordinary skill in the art can obtain other drawings based on these drawings without any creative effort.

DESCRIPTION OF EMBODIMENTS

In order to describe objectives, technical solutions and advantages of the embodiments of the present disclosure more clearly, the technical solutions in the embodiments of the present disclosure will be clearly and completely described in the following with reference to the accompanying drawings in the embodiments of the present disclosure. It is apparent that the described embodiments are a part of the embodiments of the present disclosure, rather than all of the embodiments. All other embodiments obtained by those of ordinary skill in the art based on the embodiments of the present disclosure without any creative effort are within the scope of the present disclosure.

Figure 1:
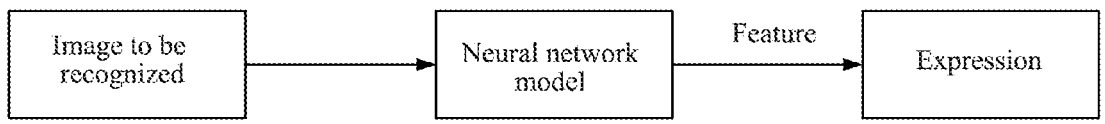
FIG. 1 is a schematic diagram of a process of recognizing an expression using a convolutional neural network recognition in the prior art.

FIG. 1 is a schematic diagram of a process of recognizing an expression using a convolutional neural network in the prior art. Referring to FIG. 1, in the process of recognition, a feature extracted from an image to be recognized is input to a neural network model, and the input feature is computed by the neural network model, thereby recognizing an expression in the image to be recognized. Among them, the neural network model is obtained according to an iterative training on a large number of sample images in advance. In this process, the neural network model only uses first-order information which is the feature extracted from the image to be recognized. The limited first-order information leads to low accuracy of expression recognition.

In view of this, the embodiments of the present application provide an expression recognition method, apparatus, electronic device, and storage medium. After a feature is extracted from an image to be recognized, the feature is transformed into second-order information, and the image to be recognized is recognized according to the second-order information, thereby improving accuracy of the expression recognition.

The embodiments of the present disclosure are applicable to scenarios in which an electronic device needs to recognize a facial expression of a user, such as human-computer interaction, driving assist, distance education, and targeted advertising. Taking the driving assist scenario as an example, during a driver's driving of a vehicle, the electronic device collects an image of the driver and recognizes the driver's expression in the image. When the driver's expression is recognized as a disgust expression, for example, the driver is in a tired state due to long-term driving, so that the driver's face presents a disgust expression, at this time, after the electronic device recognizes the expression of the driver, the driver is prompted to have a rest, or play music with faster rhythm.

In the embodiment of the present application, the expression recognition includes two stages: a model training stage and an expression recognition stage. Among them, the model training stage refers to a stage of training an expression recognition model, in which a sample image in a training set is trained to obtain the expression recognition model, and the expression recognition module includes three parts: a convolutional neural network model, a fully connected network model and a bilinear network model. The expression recognition stage refers to a stage of expression recognition using the expression recognition model trained in the model training stage. Next, the expression recognition stage will be described in detail. Exemplary, please referring to FIG. 2.

Figure 2:
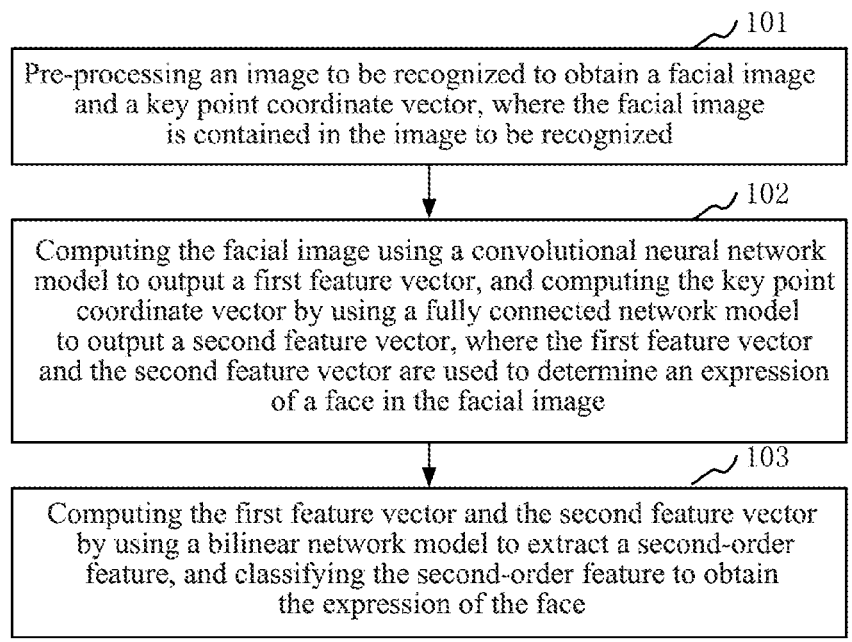
FIG. 2 is a flowchart of an expression recognition method according to an embodiment of the present disclosure.

FIG. 2 is a flowchart of an expression recognition method according to an embodiment of the present disclosure. The execution subject of the embodiment is an electronic device, and the electronic device is provided with an expression recognition apparatus. The apparatus may be implemented by software, hardware or a combination of software and hardware, and the apparatus may be all or part of the electronic device. As shown in FIG. 2, this embodiment includes:

101, pre-processing an image to be recognized to obtain a facial image and a key point coordinate vector, where the facial image is contained in the image to be recognized.

In the embodiment of the present application, the electronic device may be a device having an image collecting function, such as a camera, and the image to be recognized may be a static image collected by the electronic device, an image captured from a video stream, or an image transmitted by other device to the electronic device; or the electronic device may also be a device that does not have an image collecting function. At this time, the image to be recognized is not an image transmitted by the other device to the electronic device.

In this step, the electronic device pre-processes an image to be recognized to obtain a facial image and a key point coordinate vector, where the pre-processing includes a facial detection, a key point detection, a facial alignment, a normalization, a random data enhancement, and the like on the image to be recognized to obtain the facial image and the key point coordinate vector. In this process, the key point coordinate vector can be obtained by a convolutional neural network, and the embodiment of the present disclosure does not limit the manner of obtaining the key point coordinate vector and the facial image from the image to be recognized.

102, computing the facial image by using a convolutional neural network model to output a first feature vector, and computing the key point coordinate vector by using a fully connected network model to output a second feature vector, where the first feature vector and the second feature vector are used to determine an expression of a face in the facial image.

In the embodiment of the present application, the expression recognition model includes three parts: the convolutional neural network model, the fully connected network model and the bilinear network model. The three models are models trained in the model training stage. The output of the neural network model and the output of the fully connected network model are connected to the input of the bilinear network model.

103, computing the first feature vector and the second feature vector by using a bilinear network model to extract a second-order feature, and classifying the second-order feature to obtain the expression of the face.

In the steps 102 and 103, the facial image is computed by the convolutional neural network model to obtain a first feature vector, and the key point coordinate vector is computed by the fully connected network model to obtain a second feature vector. The first feature vector outputted by the neural network model and the second feature vector outputted by the fully connected network model are computed by the bilinear network model to obtain second-order information, and an expression recognition result in turn is obtained according to the second-order information. Among them, the second-order information, for example, is a feature matrix or the like.

According to the expression recognition method provided in the embodiment of the present disclosure, an expression recognition model includes a convolutional neural network model, a fully connected network model and a bilinear network model, and the output of the neural network model and the output of the fully connected network model are connected to the input of the bilinear network model. During an expression recognition process, after an image to be recognized is pre-processed to obtain a facial image and a key point coordinate vector, the facial image is computed by the convolutional neural network model to output a first feature vector, the key point coordinate vector is computed by the fully connected network model to output a second feature vector, the first feature vector and the second feature vector are computed by the bilinear network model to obtain second-order information, and an expression recognition result in turn is obtained according to the second-order information. During this process, in consideration of priori expression information contained in key points of a human face, robustness of gestures and illuminations is better, and accuracy of expression recognition is improved. Further, when there is low expression intensity, an expression can also be correctly recognized.

In order to clearly distinguish the training stage and the recognition stage, during a process where the training stage is described hereunder, the image of the training stage is referred to as a sample image, the key point of the training stage is referred to as a sample key point, and the facial image of the training stage is referred to as a sample facial image. Next, a detailed description will be given hereunder with regard to how the training is performed in the training stage to obtain the convolutional neural network model, the fully connected network model and the bilinear network model included in the expression recognition model as described in the above embodiment.

In a possible implementation, the training the convolutional neural network model, the fully connected network model and the bilinear network model is performed by: pre-processing, for each sample image in a training set, the sample image to obtain the sample facial image and the sample key point coordinate vector; training the convolutional neural network model according to the sample facial image; training the fully connected network model according to the sample key point coordinate vector; and training the bilinear network model according to an output result of the convolutional neural network model and an output result of the fully connected network model.

In the embodiment of the present application, the training set contains a large number of sample images. During the model training process, for each sample image in the training set, the sample image is pre-processed to obtain a sample facial image and a sample key point coordinate vector, and then the convolutional neural network model is trained according to the sample facial image, the fully connected network model is trained according to the sample key point coordinate vector, and in turn the bilinear network model is trained according to the output result of the convolutional neural network model and the output result of the fully connected network model. That is, during the model training process, the convolutional neural network model, the fully connected network model and the bilinear network model are not separately trained, and trainings of the three models are interrelated. Taking one sample image as an example, the sample facial image and the sample key point coordinate vector obtained by pre-processing the sample image are used as a training basis for the convolutional neural network model and the fully connected network model, and the output result of the convolutional neural network model and the output result of the fully connected network model are a training basis for the bilinear network model.

In the above embodiment, the purpose of training the convolutional neural network model, the fully connected network model and the bilinear network model included in the expression recognition model is achieved.

Figure 3:
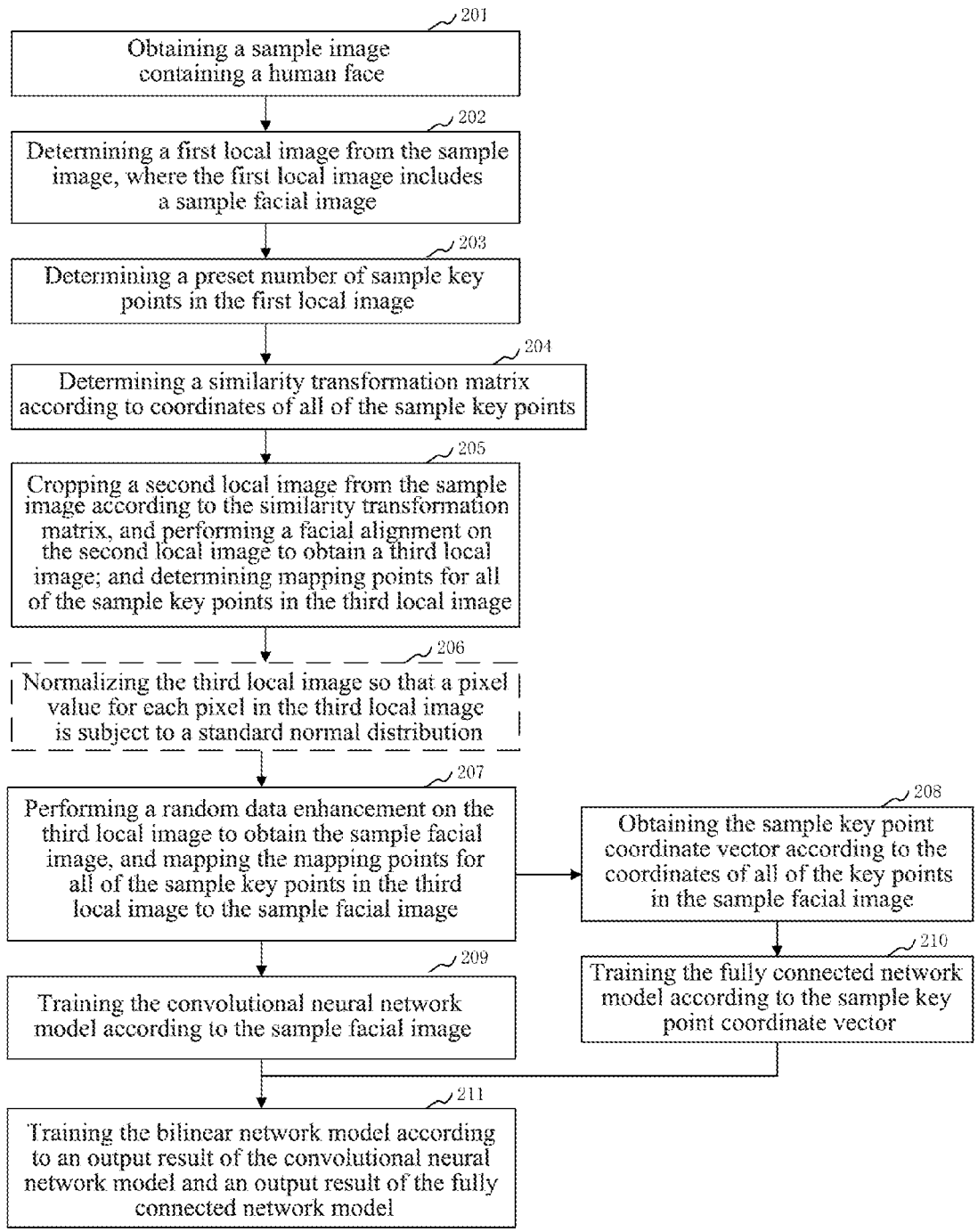
FIG. 3 a flowchart of pre-processing a sample image in an expression recognition method according to an embodiment of the present disclosure.

In the following, a detailed description will be given with regard to how to preprocess a sample image in the model training process of the above embodiment. Exemplarily, reference may be made to FIG. 3. FIG. 3 a flowchart of pre-processing a sample image in an expression recognition method according to an embodiment of the present disclosure.

201, obtaining a sample image containing a human face.

In this step, a sample image containing a human face is obtained from a training set, where the training set is stored with a large number of sample images.

202, determining a first local image from the sample image, where the first local image includes a sample facial image.

In this step, the facial image is performed with a facial detection by using a facial detection model or the like to obtain a first local image, where the first local image includes a sample facial image, that is, the first local image is a rough location area of the face in the sample image. During the detection process, when the first local image is detected, the first local image may be marked in the sample image by using a bounding box.

203, determining a preset number of sample key points in the first local image.

In this step, the key points are detected by a key point detecting model or the like according to the first local image, that is, a rough location area of the human face in the sample image, thereby obtaining coordinate values for the key points. Among them, the key points include inner and outer eyebrow tips, eyebrow peaks, inner and outer corners of eyes, upper and lower eyelids, nose tip, nostrils, left and right corners of the mouth, etc. The number of the key points is, for example, 36, 48, 72, 84 etc., which is not limited in the embodiment of the present application. Assuming that the preset number is N, where N≥1 and is an integer, the coordinates of the N key points are respectively $(x_1, y_2)$, $(x_2, y_2)$, $(x_3, y_3)$ ... $(x_N, y_N)$.

204, determining a similarity transformation matrix according to coordinates of all of the sample key points.

In this step, a similarity transformation matrix is determined according to coordinates of all of the sample key points. In the determining process, according to coordinates of the preset number of key points, an average value and a length of a cropped frame are determined, where the average value is used as a central coordinate c (x, y) of the entire face, and the similarity transformation matrix is determined according to the center coordinate and the length of the cropped frame. Exemplarily, an average value for the coordinates of all of the sample key points is determined, where the average value is used as a central coordinate, a maximum coordinate and a minimum coordinate are determined from the coordinates of all of the sample key points, a difference between the maximum coordinate and the minimum coordinate is determined, and the difference is used as the length of the cropped frame. For example, the center coordinate and the length of the cropped frame are determined according to abscissas of all of key points, and a similarity transformation matrix is determined according to the center coordinate and the length of the cropped frame; for another example, the center coordinate and the length of the cropped frame are determined according to ordinates of all of key points, and a similarity transformation matrix is determined according to the center coordinate and the length of the cropped frame; for another example, the center coordinate and the length of the cropped frame are determined according to abscissas and ordinates of all of key points, and a similarity transformation matrix is determined according to the center coordinate and the length of the cropped frame. Hereinafter, a detailed description will be given with regard to determination of the similarity transformation matrix based on the abscissas of all of key points.

Exemplarily, the formula for determining the center coordinate is as follows:

$$c(x, y) = \left( \frac{\sum_{i=1}^{N} x_i}{N}, \frac{\sum_{i=1}^{N} y_i}{N} \right),$$

where i=1, 2, 3 ... N, xi is an abscissa of a key point, and yi is an ordinate of the key point.

In the process of determining the length of the cropped frame, a key point with a maximum abscissa and a key point with a minimum abscissa are determined from the coordinates of all of the sample key points, where if the maximum abscissa, for example, is $x_{max}$, and the minimum abscissa, for example, is $x_{min}$, the length of the cropped frame $s = x_{max} - x_{min}$.

In this step, a template of facial key points is obtained according to the average of the coordinates of all the key points of the training data, by using coordinates of sample facial key points and the template of facial key points, the similarity transformation matrix M is obtained according to a general transformation, and the original image is similarly transformed into an image with only a facial region of size N*N according to a similarity transformation function; in addition, the key point coordinates of the facial sample are also transformed according to the similarity matrix.

205, cropping a second local image the sample image according to the similarity transformation matrix, and performing a facial alignment on the second local image to obtain a third local image; and determining mapping points for all of the sample key points in the third local image.

In this step, according to the similarity transformation matrix obtained in the above step 204, a second local image is cropped from the sample image, and the second local image is performed with a facial alignment to obtain the aligned second local image, the second local image subjected to the facial alignment is also referred to as a third local image, the third local image is an image containing only a face. In addition, when the facial alignment is performed, the coordinates of the preset number of the key points are also transformed along with the similarity transformation matrix. Therefore, after the facial alignment, the preset number of key points in the first local image described above will also be mapped to the third local image.

206, normalizing the third local image so that a pixel value for each pixel in the third local image is subject to a standard normal distribution.

In this step, the third local image obtained in the above step 205 is normalized. During the processing, pixels in the third local image are sequentially normalized, so that the pixel value of each pixel is subject to a standard normal distribution. For example, a pixel value of a certain pixel in the third local image is between [−0.5, 0.5]; for another example, a pixel value of a certain pixel in the third local image is between [−1, 1].

It should be noted that this step is an optional step. In an actual implementation, you can flexibly set whether to perform this step.

207, performing a random data enhancement on the third local image to obtain the sample facial image, and mapping the mapping points for all of the sample key points in the third local image to the sample facial image.

In this step, a random data enhancement is performed on the third local image to obtain the described sample facial image. Among them, the random data enhancement includes a random flip, a random translation, a random scaling, a random gradation, a random Gamma transformation or a random additive white Gaussian noise, etc. This is not limited in the embodiment of the present disclosure.

In addition, in this step, while the random data enhancement is performed on the third local image, the mapping points for all of sample key points in the third local image are also changed correspondingly, so that the mapping points for all of sample key points in the third local image are further mapped to the sample facial image.

208, obtaining the sample key point coordinate vector according to the coordinates of all of the key points in the sample facial image.

In this step, the coordinates mapped to the sample facial image in the above step 207 are transformed into a one-dimensional vector. For example, there are totally 72 sample key points, each of which has an abscissa and an ordinate; after a coordinate transformation, a one-dimensional vector is obtained. The one-dimensional vector contains 144 elements, and the one-dimensional vector is the above-mentioned sample key point coordinate vector.

209, training the convolutional neural network model according to the sample facial image.

In this step, the convolutional neural network model is trained based on the sample facial image obtained in the above step 207. During the training, the convolutional neural network model is trained using a loss function or the like. Among them, the loss function is, for example, a cross entropy loss function, and the cross entropy loss function has a regularization mode of L2 regularity.

210, training the fully connected network model according to the sample key point coordinate vector.

In this step, the fully connected network model is trained based on the sample key point coordinate vector obtained in the above step 208.

211, training the bilinear network model according to an output result of the convolutional neural network model and an output result of the fully connected network model.

In this step, the bilinear network model is trained according to an output result of the convolutional neural network model and an output result of the fully connected network model.

In the embodiment of the present disclosure, the expression recognition model is trained in the model training stage according to the above steps 201-211, then in the expression recognition stage, an image to be recognized is pre-processed, the pre-processing process can be referred to steps 201-208 in the above model training process, and details are not described herein again. Then, a facial image obtained according to the image to be recognized is inputted to the convolutional neural network model, and a key point coordinate vector obtained according to the image to be recognized is inputted to the fully connected network. The facial image is computed by the convolutional neural network model to obtain a feature vector, hereinafter referred to as a first feature vector, the key point coordinate vector is computed by the fully connected network model to obtain a feature vector, hereinafter referred to as a second feature vector. Then, the first feature vector and the second feature vector are computed by the bilinear network model to obtain a feature matrix containing second-order information. In the model training stage, feature matrices are obtained for different expressions, that is, different expressions correspond to different feature matrices. Therefore, in the expression recognition stage, a feature matrix is obtained according to image to be recognized, and then an expression in the image to be recognized can be determined according to the feature matrix and the feature matrices corresponding to various expressions obtained in the model training stage.

Figure 4:
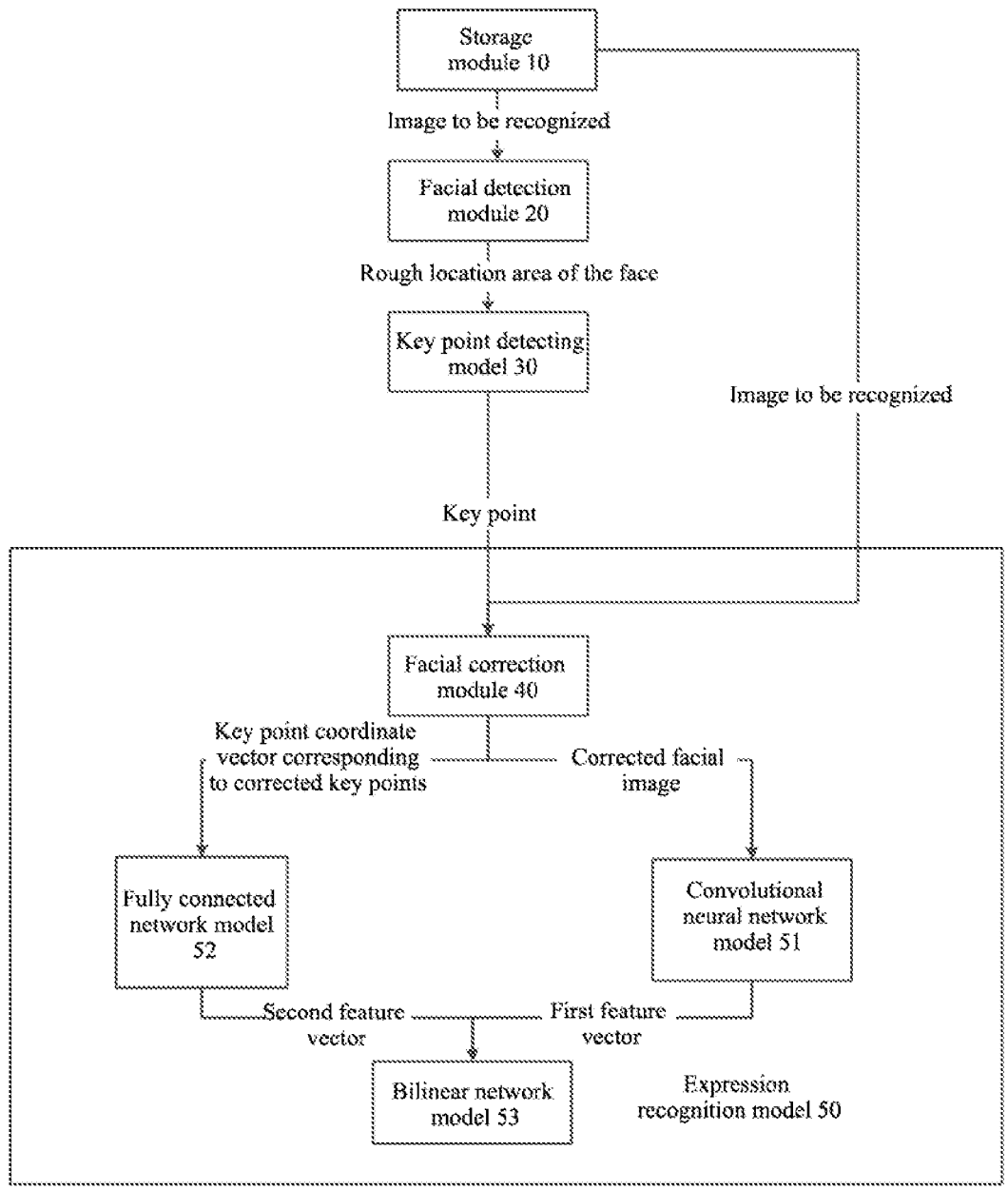
FIG. 4 is a schematic diagram of a network structure of an expression recognition model to which an expression recognition method according to an embodiment of the present disclosure is applied.

Next, a detailed description will be given to the expression recognition model obtained through the training in the model training stage as described in the above embodiment. Exemplarily, reference may be made to FIG. 4. FIG. 4 is a schematic diagram of a network structure of an expression recognition model 50 to which an expression recognition method according to an embodiment of the present disclosure is applied.

Referring to FIG. 4, the expression recognition model 50 applicable to the embodiment of the present disclosure includes the convolutional neural network model 51, the fully connected network model 52 and the bilinear network model 53, and the output of the neural network model 51 and the output of the fully connected network model 52 are connected to the input of the bilinear network model 53. Next, structures of the convolutional neural network model 51, the fully connected network model 52 and the bilinear network model 53 will be described in detail, respectively.

Firstly, the convolutional neural network model 51.

In the embodiment of the present disclosure, from the input layer to the output layer, the convolutional neural network model 51 respectively includes: a convolutional layer conv1, a BN layer conv1_bn, a scale layer conv1_scale, a Relu layer conv1_relu, a pooling layer max_pooling1, a convolutional layer conv2, a BN layer conv2_bn, a scale layer conv2_scale, a Relu layer conv2_relu, a pooling layer max pooling2, a convolutional layer conv3, a BN layer conv3_bn, a scale layer conv3_scale, a Relu layer conv3_relu, a convolutional layer conv4, a BN layer conv4_bn, a scale layer conv4_scale, a Relu layer conv4_relu, a pooling layer max_pooling3, a convolutional layer conv5, a BN layer conv5_bn, a scale layer conv5_scale, a Relu layer conv5_relu, a convolutional layer conv6, a BN layer conv6_bn, a scale layer conv6_scale, a Relu layer conv6_relu, a concat layer concat, and a global average pooling layer global_average_pooling.

Secondly, the fully connected network model 52.

In the embodiment of the present disclosure, from the input layer to the output layer, the fully connected network model 52 respectively includes: a fully connected layer fc1, a BN layer fc1_bn, a scale layer fc1_scale layer, a Relu layer fc1_relu, a fully connected layer fc2, a BN layer fc2_bn, a scale layer fc2_scale layer, a Relu layer fc2_relu, a fully connected layer fc3, a BN layer fc3_bn, a scale layer fc3_scale layer, a Relu layer fc3_relu, and a fully connected layer fc4.

Finally, the bilinear network model 53.

In the embodiment of the present disclosure, from the input layer to the output layer, the bilinear network model 53 respectively includes: a bilinear layer, a fully connected layer fc, and a softmax layer.

In the embodiment of the present disclosure, for an image to be recognized stored in the storage module 10, a rough location area of the face is detected by using a facial detection module 20, and then key points are extracted by using a key point detecting model 30; after that, by using a facial correction module 40, a similarity transformation matrix is determined according to the key points, the image to be recognized is performed with a facial correction according to the similarity transformation matrix to obtain a corrected facial image and corrected key points, and a key point coordinate vector is obtained according to the corrected key points; finally, the facial image is computed by using the convolutional neural network model 51 so that a first feature vector is obtained, the key point coordinate vector is computed by using the fully connected network model 52 so that a second feature vector is obtained; finally, the first feature vector and the second feature vector are computed by using the bilinear network model 53 so that a second-order feature is extracted, and the second-order feature is classified to obtain an expression of the face.

The following is an embodiment of the apparatus of the present disclosure, which can be used to carry out the method embodiments of the present disclosure. For details not disclosed in the embodiment of the apparatus of the present disclosure, please refer to the method embodiments of the present disclosure.

Figure 5:
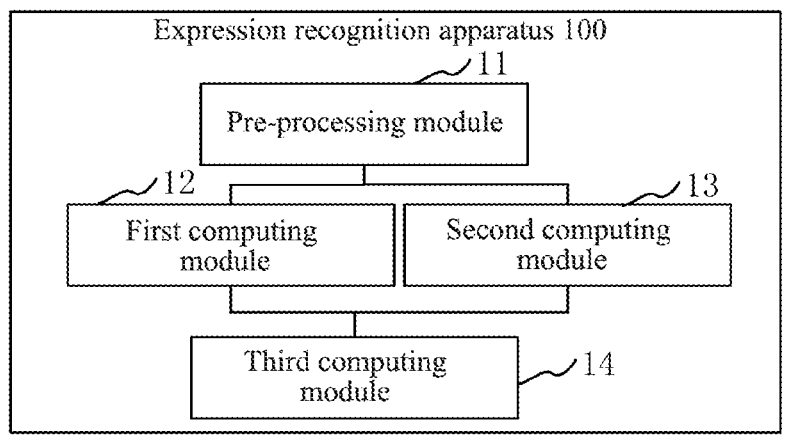
FIG. 5 is a schematic structural diagram of an expression recognition apparatus according to an embodiment of the present disclosure.

FIG. 5 is a schematic structural diagram of an expression recognition apparatus according to an embodiment of the present disclosure, the expression recognition apparatus can be implemented by software and/or hardware. As shown in FIG. 5, the expression recognition apparatus 100 includes:

a pre-processing module 11, configured to pre-process an image to be recognized to obtain a facial image and a key point coordinate vector, where the facial image is contained in the image to be recognized;

a first computing module 12, configured to compute the facial image using a convolutional neural network model to output a first feature vector;

a second computing module 13, configured to compute the key point coordinate vector using a fully connected network model to output a second feature vector; and a third computing module 14, configured to compute the first feature vector and the second feature vector using a bilinear network model to extract a second-order feature, and classify the second-order feature to obtain the expression of the face.

Figure 6:
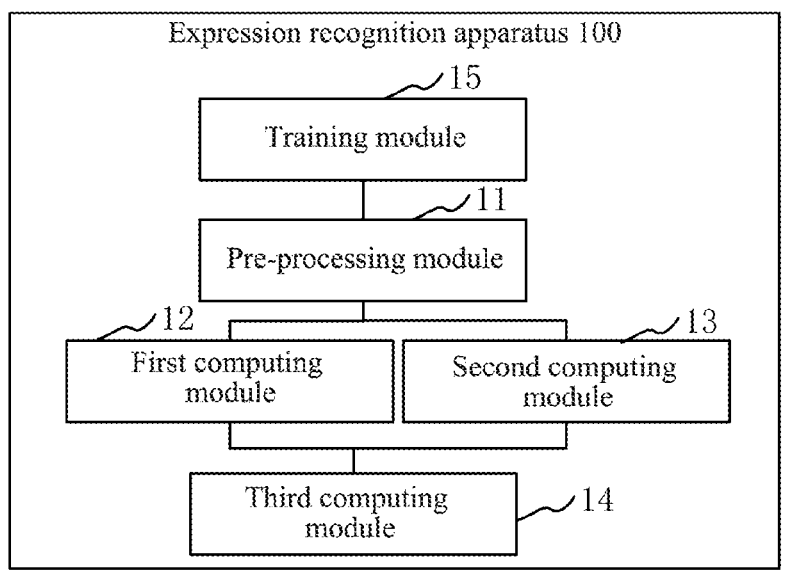
FIG. 6 is a schematic structural diagram of an another expression recognition apparatus according to an embodiment of the present disclosure.

FIG. 6 is a schematic structural diagram of another expression recognition apparatus according to an embodiment of the present disclosure. As shown in FIG. 6, on the basis of FIG. 5, the expression recognition apparatus 100 also further includes:

a training module 15, configured to train the convolutional neural network model, the fully connected network model and the bilinear network model before the pre-processing module 11 pre-processes an image to be recognized to obtain a facial image and a key point coordinate vector.

In a possible implementation, the training module 15 is specifically configured to: for each sample image in a training set, pre-process the sample image to obtain the sample facial image and a sample key point coordinate vector; train the convolutional neural network model according to the sample facial image; train the fully connected network model according to the sample key point coordinate vector; and train the bilinear network model according to an output result of the convolutional neural network model and an output result of the fully connected network model.

In a possible implementation, when each sample image in a training set is pre-processed to obtain the sample facial image and a sample key point coordinate vector, the training module 15 is specifically configured to: determine a first local image from the sample image, where the first local image includes the sample facial image; determine a preset number of sample key points in the first local image; determine a similarity transformation matrix according to coordinates of all of the sample key points; crop a second local image from the sample image according to the similarity transformation matrix and perform a facial alignment on the second local image to obtain a third local image; and determine mapping points for all of the sample key points in the third local image; perform a random data enhancement on the third local image to obtain the sample facial image, and map the mapping points for all of the sample key points in the third local image to the sample facial image; and obtain the sample key point coordinate vector according to the coordinates of all of the sample key points in the sample facial image.

In a possible implementation, when a similarity transformation matrix is determined according to coordinates of all of the sample key points, the training module 15 is specifically configured to: determine an average value for the coordinates of all of the sample key points; determine a maximum coordinate and a minimum coordinate from the coordinates of all of the sample key points, and determine a difference between the maximum coordinate and the minimum coordinate; and determine the similarity transformation matrix according to the difference and the average value.

In a possible implementation, before a random data enhancement is performed on the third local image to obtain the sample facial image, the training module 15 is further configured to normalize the third local image so that a pixel value for each pixel in the third local image is subject to a standard normal distribution.

In a possible implementation, the random data enhancement includes: a random flip, a random translation, a random scaling, a random gradation, a random Gamma transformation or a random additive white Gaussian noise.

In a possible implementation, when training the convolutional neural network model, the training module 15 trains the convolutional neural network model using a loss function.

In a possible implementation, the loss function is a cross entropy loss function, and the cross entropy loss function has a regularization mode of L2 regularity.

Figure 7:
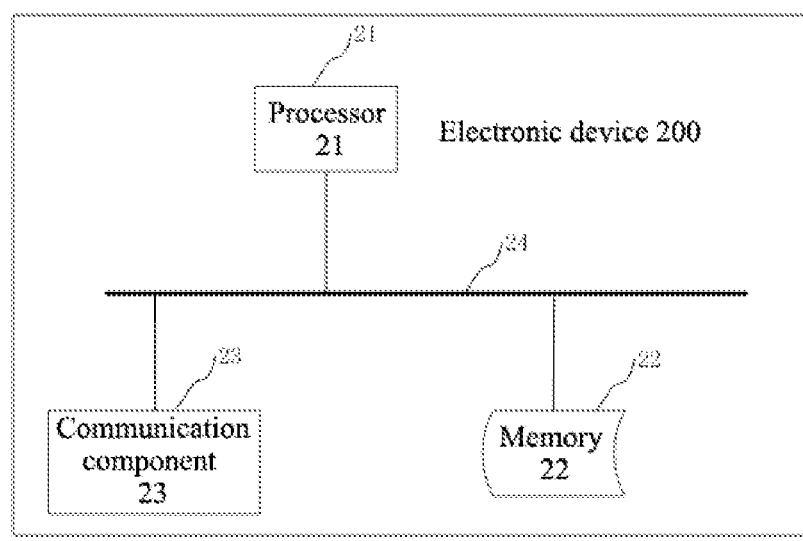
FIG. 7 is a schematic structural diagram of an electronic device according to an embodiment of the present disclosure.

FIG. 7 is a schematic structural diagram of an electronic device according to an embodiment of the present disclosure. As shown in FIG. 7, the electronic device 200 includes:

at least one processor 21 and a memory 22;

where the memory 22 is stored with a computer executable program; and the at least one processor 21 executes the computer executable program stored on the memory 22, so that the at least one processor 21 performs the expression recognition method as described above.

For a specific implementation process of the processor 21, reference may be made to the foregoing method embodiments, implementation principles and technical effects thereof are similar, and details will not be described herein again.

Optionally, the electronic device 200 further includes a communication component 23. The processor 21, the memory 22, and the communication component 23 can be connected via a bus 24.

An embodiment of the present disclosure further provides a storage medium having stored therein a computer executable instruction which, when executed by the processor, is used to implement the expression recognition method as described above.

An embodiment of the present disclosure further provides a computer program product which, when running on a computer, causes the computer to perform the expression recognition method as described above.

In the above-described embodiments, it should be understood that the described device and method may be implemented in other manners. For example, the device embodiments described above are merely illustrative. For example, the division of the module is only a logical function division, and during an actual implementation, there may be another division manner. For example, multiple modules may be combined or may be integrated into another system, or some features may be ignored or not performed. In addition, the mutual couplings or direct couplings or communication connections shown or discussed may be implemented through some interfaces. The indirect couplings or communication connections between apparatuses or modules may be implemented in electrical, mechanical or other forms.

The modules described as separate components may or may not be physically separated, and the components shown as modules may or may not be physical units, that is, may be located in one place, or may be distributed to multiple network units. Some or all of the modules may be selected according to actual needs to achieve the purpose of the solution of the embodiment.

In addition, functional modules in the embodiments of the present disclosure may be integrated into one processing unit, or each module may exist alone physically, or two or more modules may be integrated into one unit. The unit integrated by the above modules can be implemented in the form of hardware or in the form of hardware plus software functional units.

The above-described integrated module implemented in the form of software function modules can be stored in a computer readable storage medium. The software functional modules described above are stored in a storage medium, and include instructions for causing an electronic device (which may be a personal computer, server, or network device, etc.) or processor to perform part of the steps of the method described in various embodiments of the present disclosure.

It should be understood that the foregoing processor may be a central processing unit (CPU), or may be other general purpose processor, digital signal processor (DSP), application specific integrated circuit (ASIC), or the like. The general purpose processor may be a micro-processor or the processor may also be any conventional processor or the like. The steps of the method disclosed with reference to the present disclosure may be directly implemented by a hardware processor or by a combination of hardware and software modules in the processor.

The memory may include a high speed RAM memory, and may also include a non-volatile memory (NVM), such as at least one disk memory, a USB flash drive, a mobile hard disk, a read only memory, a magnetic disk, or an optical disk.

The bus may be an industry standard architecture (ISA) bus, a peripheral component interconnect (PCI) bus, or an extended industry standard architecture (EISA) bus. The bus can be divided into an address bus, a data bus, a control bus, and the like. For ease of representation, the bus in the drawings of the present disclosure is not limited to only one bus or one type of bus.

The above storage medium may be implemented by any type of volatile or non-volatile storage device or a combination thereof, such as a static random access memory (SRAM), an electrically erasable programmable read only memory (EEPROM), an erasable programmable read only memory (EPROM), a programmable read only memory (PROM), a read only memory (ROM), a magnetic memory, a flash memory, a disk or a CD. The storage medium may be any available media that can be accessed by a general purpose or special purpose computer.

An exemplary storage medium is coupled to a processor to enable the processor to read information from, and write information to, the storage medium. Of course, the storage medium can also be an integral part of the processor. The processor and the storage medium may be located in an application specific integrated circuit (ASIC). Of course, the processor and the storage medium may also reside as discrete components in a terminal or a server.

One of ordinary skill in the art will appreciate that all or part of the steps to implement the various method embodiments described above may be accomplished by hardware associated with the program instructions. The aforementioned program can be stored in a computer readable storage medium. The program, when executed, performs the steps containing the foregoing method embodiments; and the foregoing storage medium includes various media that can store program codes, such as an ROM, an RAM, a magnetic disk, or an optical disk.

Finally, it should be noted that the above embodiments are only used to illustrate the technical solutions of the present disclosure, and rather than limiting the present disclosure; although the present disclosure has been described in detail with reference to the foregoing embodiments, for those of ordinary skill in the art, it will be appreciated that they may still make modifications to the technical solutions described in the foregoing embodiments or make equivalent substitutions to some or all of the technical features therein. However, these modifications or substitutions do not make the essence of corresponding technical solutions depart from the scope of the technical solutions of the embodiments of the present disclosure.

What is claimed is:

1. An expression recognition method, comprising:
   pre-processing an image to be recognized to obtain a facial image and a key point coordinate vector, wherein the facial image is contained in the image to be recognized;
   processing the facial image using a convolutional neural network model to output a first feature vector, and processing the key point coordinate vector using a fully connected network model to output a second feature vector, wherein the first feature vector and the second feature vector are used to determine an expression of a face in the facial image; and
   processing the first feature vector and the second feature vector using a bilinear network model to extract a second-order feature, and classifying the second-order feature to obtain the expression of the face, wherein the second-order feature is a feature matrix, and different expressions correspond to different feature matrices.

2. The method according to claim 1, before the pre-processing an image to be recognized to obtain a facial image and a key point coordinate vector, further comprising:
   training the convolutional neural network model, the fully connected network model and the bilinear network model.

3. The method according to claim 2, wherein the training the convolutional neural network model, the fully connected network model and the bilinear network model is performed by:
   pre-processing, for each sample image in a training set, the sample image to obtain a sample facial image and a sample key point coordinate vector;
   training, according to the sample facial image, the convolutional neural network model;
   training, according to the sample key point coordinate vector, the fully connected network model; and
   training, according to an output result of the convolutional neural network model and an output result of the fully connected network model, the bilinear network model.

4. The method according to claim 3, wherein the pre-processing each sample image in a training set to obtain the sample facial image and a sample key point coordinate vector comprises:
   determining a first local image from the sample image, wherein the first local image comprises the sample facial image;
   determining, in the first local image, a preset number of sample key points;
   determining, according to coordinates of all of the sample key points, a similarity transformation matrix;
   cropping, according to the similarity transformation matrix, a second local image from the sample image and performing a facial alignment on the second local image to obtain a third local image; and determining, in the third local image, mapping points for all of the sample key points;
   performing a random data enhancement on the third local image to obtain the sample facial image, and mapping the mapping points for all of the sample key points in the third local image to the sample facial image; and obtaining, according to the coordinates of all of the sample key points in the sample facial image, the sample key point coordinate vector.

5. The method according to claim 4, wherein the determining, according to coordinates of all of the sample key points, a similarity transformation matrix comprises:

determining an average value for the coordinates of all of the sample key points;

determining, from the coordinates of all of the sample key points, a maximum coordinate and a minimum coordinate, and determining a difference between the maximum coordinate and the minimum coordinate; and determining, according to the difference and the average value, the similarity transformation matrix.

6. The method according to claim 4, before the performing a random data enhancement on the third local image to obtain the sample facial image, further comprising:

normalizing the third local image so that a pixel value for each pixel in the third local image is subject to a standard normal distribution.

7. The method according to claim 4, wherein the random data enhancement comprises: a random flip, a random translation, a random scaling, a random gradation, a random Gamma transformation or a random additive white Gaussian noise.

8. An electronic device, comprising a processor, a memory and a computer program stored on the memory and executable on the processor, wherein the processor, when executing the program, being configured to:

pre-process an image to be recognized to obtain a facial image and a key point coordinate vector, wherein the facial image is contained in the image to be recognized;

process the facial image using a convolutional neural network model to output a first feature vector, and process the key point coordinate vector using a fully connected network model to output a second feature vector, wherein the first feature vector and the second feature vector are used to determine an expression of a face in the facial image; and process the first feature vector and the second feature vector using a bilinear network model to extract a second-order feature, and classify the second-order feature to obtain the expression of the face, wherein the second-order feature is a feature matrix, and different expressions correspond to different feature matrices.

9. The electronic device according to claim 8, wherein the processor is further configured to:

train the convolutional neural network model, the fully connected network model and the bilinear network model before pre-processing an image to be recognized to obtain a facial image and a key point coordinate vector.

10. The electronic device according to claim 9, wherein the processor is further configured to:

pre-process, for each sample image in a training set, the sample image to obtain a sample facial image and a sample key point coordinate vector;

train, according to the sample facial image, the convolutional neural network model;

train, according to the sample key point coordinate vector, the fully connected network model; and train, according to an output result of the convolutional neural network model and an output result of the fully connected network model, the bilinear network model.

11. The electronic device according to claim 10, wherein the processor is further configured to:

determine a first local image from the sample image, wherein the first local image comprises the sample facial image;

determine, in the first local image, a preset number of sample key points;

determine, according to coordinates of all of the sample key points, a similarity transformation matrix;

crop, according to the similarity transformation matrix, a second local image from the sample image and perform a facial alignment on the second local image to obtain a third local image; and determine, in the third local image, map points for all of the sample key points;

perform a random data enhancement on the third local image to obtain the sample facial image, and map the map points for all of the sample key points in the third local image to the sample facial image; and obtain, according to the coordinates of all of the sample key points in the sample facial image, the sample key point coordinate vector.

12. The electronic device according to claim 11, wherein the processor is further configured to:

determine an average value for the coordinates of all of the sample key points;

determine, from the coordinates of all of the sample key points, a maximum coordinate and a minimum coordinate, and determine a difference between the maximum coordinate and the minimum coordinate; and determine, according to the difference and the average value, the similarity transformation matrix.

13. The electronic device according to claim 11, wherein the processor is further configured to:

normalize the third local image so that a pixel value for each pixel in the third local image is subject to a standard normal distribution before performing a random data enhancement on the third local image to obtain the sample facial image.

14. The electronic device according to claim 11, wherein the random data enhancement comprises: a random flip, a random translation, a random scaling, a random gradation, a random Gamma transformation or a random additive white Gaussian noise.

15. A non-transitory storage medium having stored therein an instruction which, when executed by a computer, implements the steps:

pre-processing an image to be recognized to obtain a facial image and a key point coordinate vector, wherein the facial image is contained in the image to be recognized;

processing the facial image using a convolutional neural network model to output a first feature vector, and processing the key point coordinate vector using a fully connected network model to output a second feature vector, wherein the first feature vector and the second feature vector are used to determine an expression of a face in the facial image; and processing the first feature vector and the second feature vector using a bilinear network model to extract a second-order feature, and classifying the second-order feature to obtain the expression of the face, wherein the second-order feature is a feature matrix, and different expressions correspond to different feature matrices.

16. The non-transitory storage medium according to claim 15, wherein the storage medium further comprises computer execution instruction which, when executed by a processor, implements the steps:

training the convolutional neural network model, the fully connected network model and the bilinear network model before pre-processing an image to be recognized to obtain a facial image and a key point coordinate vector.

17. The non-transitory storage medium according to claim 16, wherein the storage medium further comprises computer execution instruction which, when executed by a processor, implements the steps:
   pre-processing, for each sample image in a training set, the sample image to obtain a sample facial image and a sample key point coordinate vector;
   training, according to the sample facial image, the convolutional neural network model;
   training, according to the sample key point coordinate vector, the fully connected network model; and
   training, according to an output result of the convolutional neural network model and an output result of the fully connected network model, the bilinear network model.

18. The non-transitory storage medium according to claim 17, wherein the storage medium further comprises computer execution instruction which, when executed by a processor, implements the steps:
   determining a first local image from the sample image, wherein the first local image comprises the sample facial image;
   determining, in the first local image, a preset number of sample key points;
   determining, according to coordinates of all of the sample key points, a similarity transformation matrix;
   cropping, according to the similarity transformation matrix, a second local image from the sample image and performing a facial alignment on the second local image to obtain a third local image; and determining, in the third local image, map points for all of the sample key points;
   performing a random data enhancement on the third local image to obtain the sample facial image, and mapping the map points for all of the sample key points in the third local image to the sample facial image; and
   obtaining, according to the coordinates of all of the sample key points in the sample facial image, the sample key point coordinate vector.

19. The non-transitory storage medium according to claim 18, wherein the storage medium further comprises computer execution instruction which, when executed by a processor, implements the steps:
   determining an average value for the coordinates of all of the sample key points;
   determining, from the coordinates of all of the sample key points, a maximum coordinate and a minimum coordinate, and determining a difference between the maximum coordinate and the minimum coordinate; and
   determining, according to the difference and the average value, the similarity transformation matrix.

20. The non-transitory storage medium according to claim 18, wherein the storage medium further comprises computer execution instruction which, when executed by a processor, implements the steps:
   normalizing the third local image so that a pixel value for each pixel in the third local image is subject to a standard normal distribution before performing a random data enhancement on the third local image to obtain the sample facial image.

* * * * *